Patented Mar. 7, 1950

2,500,011

UNITED STATES PATENT OFFICE 2,500,011

2-ALLYL-CHLOROPHENOXY-2-PROPANOLS

Arthur R. Sexton and Edgar C. Britton, Midland, Mich., assignors to The Dow Chemical Company, Midland, Mich., a corporation of Delaware No Drawing. Application January 17, 1949,
Serial No. 71,388

3 Claims. (Cl. 260—613)

This invention is concerned with the 1-(2-allyl-chlorophenoxy)-2-propanols having the formula

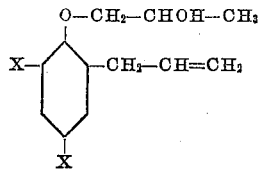

wherein one X is chlorine and the other X hydrogen. The new ether-alcohols are somewhat soluble in many organic solvents, substantially insoluble in water, stable to light and air and non-corrosive to the skin of man and higher animals. They are particularly valuable as intermediates for the preparation of more complex organic derivatives and as parasiticidal toxicants.

The compounds may be prepared by reacting propylene oxide with 2-allyl-4-chlorophenol or 2-allyl-6-chlorophenol in the presence of sodium hydroxide as catalyst. Good results are obtained when substantially equimolecular proportions of the phenol and propylene oxide are employed. In carrying out the reaction, the phenol, propylene oxide and catalyst are mixed together and heated under autogeneous pressure at a temperature of between 150° and 200° C. for a period of time to complete the reaction. The reaction mixture is then fractionally distilled under reduced pressure to obtain the desired product.

The 2-allyl-4-chlorophenol and 2-allyl-6-chlorophenyl employed as starting materials may be prepared by heating an allyl-4-chlorophenyl ether or allyl-2-chlorophenyl ether for a period of time at the boiling temperature and under reflux. Upon completion of the reaction, the desired phenol is obtained from the reaction mixture by conventional methods of separation, such as fractional distillation and fractional crystallization.

The following examples illustrate the invention but are not to be construed as limiting the same.

Example 1

185 grams (1.1 moles) of 2-allyl-6-chlorophenol (boiling at 58° to 60° C. at 2 millimeters pressure), 63.5 grams (1.1 moles) of propylene oxide and 0.8 gram of 50 per cent aqueous sodium hydroxide were heated in a pressure reactor with agitation and under autogenous pressure at 185° to 190° C. for 20 hours. The reaction mixture was then fractionally distilled under reduced pressure to obtain 1-(2-allyl-6-chlorophenoxy)-2-propanol as a water-white oily liquid having a boiling point of 122° C. at 3 millimeters pressure, a refractive index $n_D$ of 1.5315 at 25° C. and a specific gravity of 1.1285 at 25°/25° C. A portion of this product was dispersed in water to produce a spray composition. The proportions of constituents were 3 pounds of toxicant, 0.37 pound of the dioctyl ester of sodium sulfosuccinic acid (Aerosol OT) and 0.38 pound of refined kerosene per 100 gallons of solution. When employed for the control of two-spotted spider mite, such composition gave a control of 100 per cent.

Example 2

203 grams (1.2 moles) of 2-allyl-4-chlorophenol (boiling at 256° to 260° C. at 760 millimeters pressure), 77 grams (1.32 moles) of propylene oxide and 2.0 grams of 50 per cent aqueous sodium hydroxide were heated in a pressure reactor with agitation and under autogeneous pressure at 180° C. for 2 hours. The crude mixture was then fractionally distilled under reduced pressure to obtain 1-(2-allyl-4-chlorophenoxy)-2-propanol as a crystalline solid boiling at 142° C. at 3 millimeters pressure and having a freezing point of 60° C. A portion of this product was dispersed in water in the proportion of 1 pound of toxicant, 0.2 pound of the dioctyl ester of sodium sulfosuccinic acid (Aerosol OT) and 0.8 pound of refined kerosene per 100 gallons of spray composition. When employed for the control of two-spotted spider mite, such composition gave a control of 99 per cent.

We claim:

1. A 1-(2-allyl-chlorophenoxy)-2-propanol having the formula

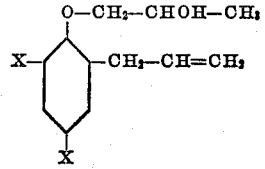

wherein one X is chlorine and the other X is hydrogen.

2. 1-(2-allyl-4-chlorophenoxy)-2-propanol.
3. 1-(2-allyl-6-chlorophenoxy)-2-propanol.

ARTHUR R. SEXTON.
EDGAR C. BRITTON.

No references cited.